(12) United States Patent
Boren et al.

(10) Patent No.: US 8,608,108 B2
(45) Date of Patent: Dec. 17, 2013

(54) AIRCRAFT CONFIGURATION WITH RAMP ACCESS TO MULTIPLE DECKS

(75) Inventors: Kelly L. Boren, Marysville, WA (US); Paul Andrew Kinzer, Bothell, WA (US)

(73) Assignee: The Boeing Company, Chicago, IL (US)

( * ) Notice: Subject to any disclaimer, the term of this patent is extended or adjusted under 35 U.S.C. 154(b) by 216 days.

(21) Appl. No.: 12/960,264

(22) Filed: Dec. 3, 2010

(65) Prior Publication Data

US 2012/0138743 A1    Jun. 7, 2012

(51) Int. Cl.
  *B64D 11/00*    (2006.01)
  *B64D 13/00*    (2006.01)

(52) U.S. Cl.
  USPC .............. 244/118.5; 244/118.6; 244/119; 244/120; 244/137.1

(58) Field of Classification Search
  USPC ............ 244/118.6, 118.5, 119, 120, 137.1; 105/396, 397, 329.1, 340; 296/178, 296/179, 184.1
  See application file for complete search history.

(56) References Cited

U.S. PATENT DOCUMENTS

| | | | |
|---|---|---|---|
| 3,438,162 A * | 4/1969 | Graham | 52/175 |
| 4,022,404 A * | 5/1977 | Greiss | 244/118.5 |
| 4,066,227 A * | 1/1978 | Buchsel | 244/118.6 |
| 4,165,810 A * | 8/1979 | Young | 414/595 |
| 4,425,851 A * | 1/1984 | Long | 104/20 |
| 4,500,299 A * | 2/1985 | Kelley et al. | 446/230 |
| 4,582,354 A * | 4/1986 | Halim | 296/64 |
| 4,715,292 A * | 12/1987 | Pavlick et al. | 105/456 |
| 4,925,132 A * | 5/1990 | Zider | 244/118.1 |
| 5,063,859 A * | 11/1991 | Rader | 105/340 |
| D336,417 S * | 6/1993 | Yuen et al. | D8/373 |
| 5,542,626 A * | 8/1996 | Beuck et al. | 244/107 |
| 5,644,989 A * | 7/1997 | Blanchier et al. | 105/340 |
| 5,784,836 A * | 7/1998 | Ehrick | 52/79.8 |
| 5,853,280 A * | 12/1998 | Lohr | 414/482 |
| 5,992,797 A * | 11/1999 | Seidel et al. | 244/118.5 |
| 6,209,270 B1 * | 4/2001 | Johnston | 52/175 |
| 6,237,872 B1 * | 5/2001 | Bar-Levav | 244/118.6 |
| 6,616,098 B2 * | 9/2003 | Mills | 244/118.5 |
| 6,945,176 B2 * | 9/2005 | Santti et al. | 105/3 |
| 7,395,989 B2 * | 7/2008 | Saint-Jalmes et al. | 244/118.1 |
| 7,562,844 B2 * | 7/2009 | Boren | 244/118.5 |
| 7,717,372 B2 | 5/2010 | Sankrithi et al. | |
| D622,653 S | 8/2010 | Moore et al. | |
| 7,900,865 B2 | 3/2011 | Moore et al. | |
| 8,016,233 B2 | 9/2011 | Moore et al. | |
| 8,087,607 B2 | 1/2012 | Moore et al. | |
| 2001/0000639 A1 * | 5/2001 | Park et al. | 297/411.3 |
| 2003/0219329 A1 * | 11/2003 | Ganiere | 414/399 |
| 2006/0038069 A1 * | 2/2006 | Cawley | 244/114 R |
| 2008/0073463 A1 * | 3/2008 | Guering | 244/118.6 |
| 2009/0224570 A1 * | 9/2009 | Haswell et al. | 296/178 |
| 2010/0084510 A1 * | 4/2010 | Bock | 244/118.1 |

* cited by examiner

*Primary Examiner* — Tien Dinh
*Assistant Examiner* — Assres H Woldemaryam
(74) *Attorney, Agent, or Firm* — Alston & Bird LLP

(57) ABSTRACT

An aircraft may include a cabin having a first portion, a second portion, a first ramp and a second ramp. The first portion of the cabin may include an upper deck and a lower deck. The upper deck and the lower deck may be disposed proximate to each other with vertical separation therebetween. The second portion may include an intermediate deck disposed in a plane that is substantially parallel to planes in which the upper deck and the lower deck lie. The intermediate deck may be vertically separated from both the upper deck and the lower deck. The first ramp may extend between the lower deck and the intermediate deck to provide access therebetween. The second ramp may extend between the upper deck and the intermediate deck to provide access therebetween.

22 Claims, 9 Drawing Sheets

AIRCRAFT CONFIGURATION WITH RAMP ACCESS TO MULTIPLE DECKS

TECHNOLOGICAL FIELD

Figure 1A:
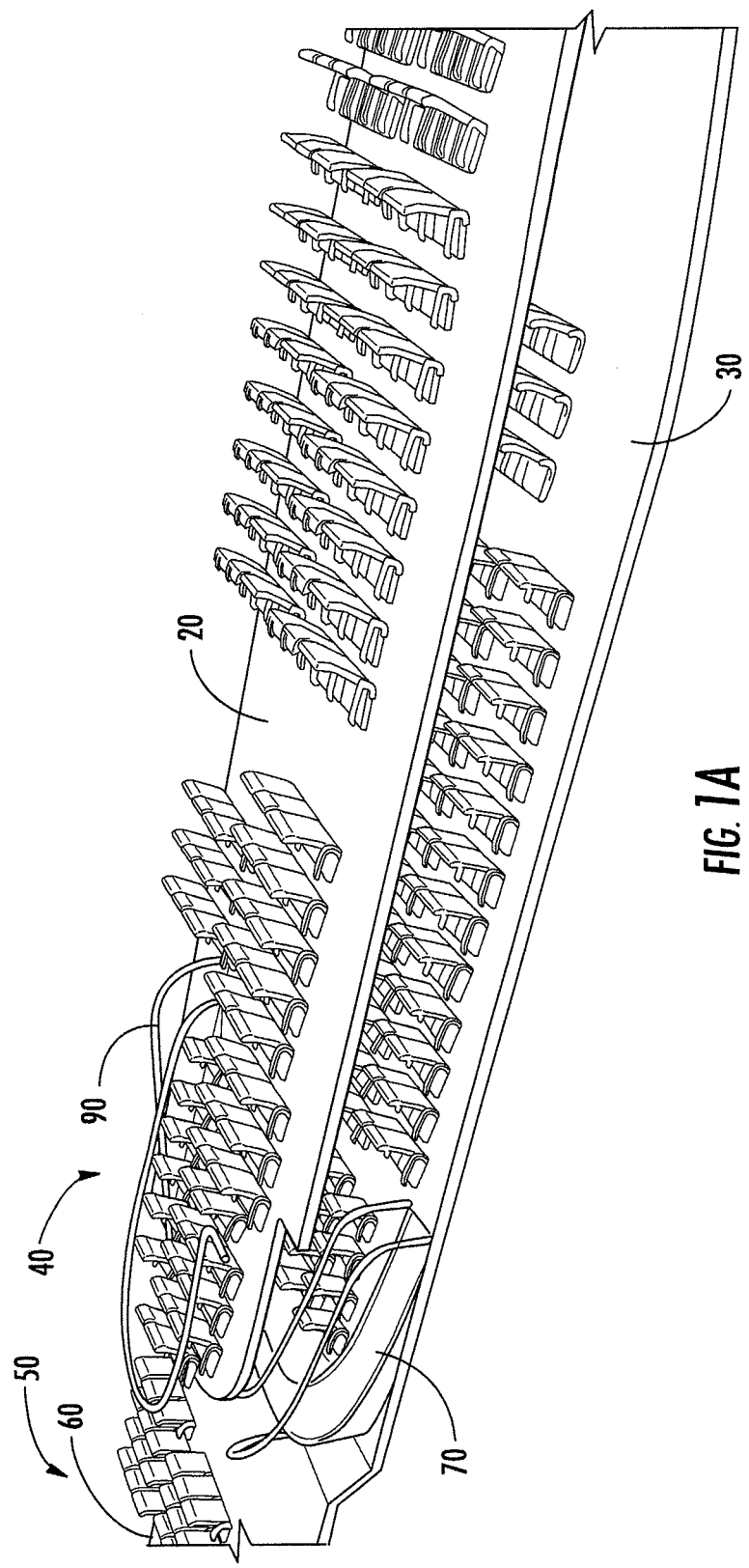

Embodiments of the present disclosure relate generally to aircraft design and, more particularly, to an aircraft configuration with ramp access to multiple decks.

BACKGROUND

Even after about a century of development, most commercial fixed wing aircraft continue to be designed around the same core features including wings, a fuselage, control surfaces and engines. Although there have been numerous advances in aerodynamics, materials employed, power and efficiency of engines used, and other improvements in component design, the basic structure has remained roughly similar for quite some time. During this period, the largely cylindrically shaped fuselage has remained a recognizable and consistent feature of commercial aircraft.

Particularly for passenger airliners, the fuselage has typically been divided into separate decks. In many instances, passengers sit on an upper deck that is pressurized and is referred to as the cabin. The cabin is often separated from a lower deck in which cargo is housed. However, for some larger sized passenger airliners, multiple passenger decks may be employed over at least a portion of the cabin area.

In the past, the use of multiple decks in the cabin area has only been employed on the largest airliners. However, even on these relatively large airliners, due to size and design constraints, moving from an upper level to a lower level (or vice versa) in a multiple deck airliner has typically been facilitated by the provision of staircases or ladders. Some airliners have also employed cart lifts to facilitate movement of carts between levels. Having multiple decks in the cabin area can create complications for boarding and deplaning. For example, accessibility of certain areas of the plane (i.e., those accessible only via using stairs or ladders) may be restricted based on age or health of the passengers. Furthermore, movement of carry-on luggage up and/or down stairs and ladders can be difficult for even healthy adults in some cases. Stairs or ladders also typically end up being a choke point that slows down boarding or egress.

Accordingly, it may be desirable to develop alternative ways of arranging the layout of the interior of the fuselage to overcome some of the disadvantages described above.

BRIEF SUMMARY

Some embodiments of the present disclosure relate to the provision of an aircraft configuration that improves accessibility in a multiple deck airplane cabin environment. Thus, for example, ramps may be employed to facilitate access between levels in a multiple deck cabin environment. In some cases, elliptical ramps may be employed to provide access from an intermediate deck that is positioned at one portion of the aircraft cabin to both an upper deck and a lower deck that are positioned at another portion of the aircraft cabin. Accordingly, access to both the upper and lower deck (and therebetween) may be facilitated by a mechanism that makes efficient use of the available space, is easy to walk up or down with or without baggage (including rolling baggage) or carts, and is also aesthetically pleasing.

In one example embodiment, an aircraft including a cabin is provided. The cabin of the aircraft may include a first portion, a second portion, a first ramp and a second ramp. The first portion of the cabin may include an upper deck and a lower deck. The upper deck and the lower deck may be disposed proximate to each other with vertical separation therebetween. The second portion may include an intermediate deck disposed in a plane that is substantially parallel to planes in which the upper deck and the lower deck lie. The intermediate deck may be vertically separated from both the upper deck and the lower deck. The first ramp may extend between the lower deck and the intermediate deck to provide access therebetween. The second ramp may extend between the upper deck and the intermediate deck to provide access therebetween.

In another example embodiment, an aircraft including a cabin is provided. The cabin may include an upper deck and a lower deck. The upper and lower decks may be disposed proximate to each other with vertical separation therebetween. The upper deck may include an upper cantilevered region and an upper main deck region. The upper cantilevered region may be spaced from opposite walls of the cabin and the upper main deck region may extend between the opposite walls of the cabin. The upper cantilevered region may be operably connected to and extend outwardly from the upper main deck region so as to extend in a cantilevered fashion therefrom.

In another example embodiment, an aircraft ramp is provided. The aircraft ramp may include a first ramp portion and a second ramp portion. The first ramp portion may extend from an upper deck of a first portion of an aircraft cabin to an intermediate deck of a second portion of the aircraft cabin. The second ramp portion may extend from a lower deck of the first portion of the aircraft cabin to the intermediate deck. The upper deck and the lower deck may be disposed proximate to each other with vertical separation therebetween and the intermediate deck may be vertically separated from both the upper deck and the lower deck.

The features, functions and advantages that have been discussed can be achieved independently in various embodiments of the present disclosure or may be combined in yet other embodiments, further details of which can be seen with reference to the following description and drawings.

BRIEF DESCRIPTION OF THE SEVERAL VIEWS OF THE DRAWING(S)

Figure 1B:
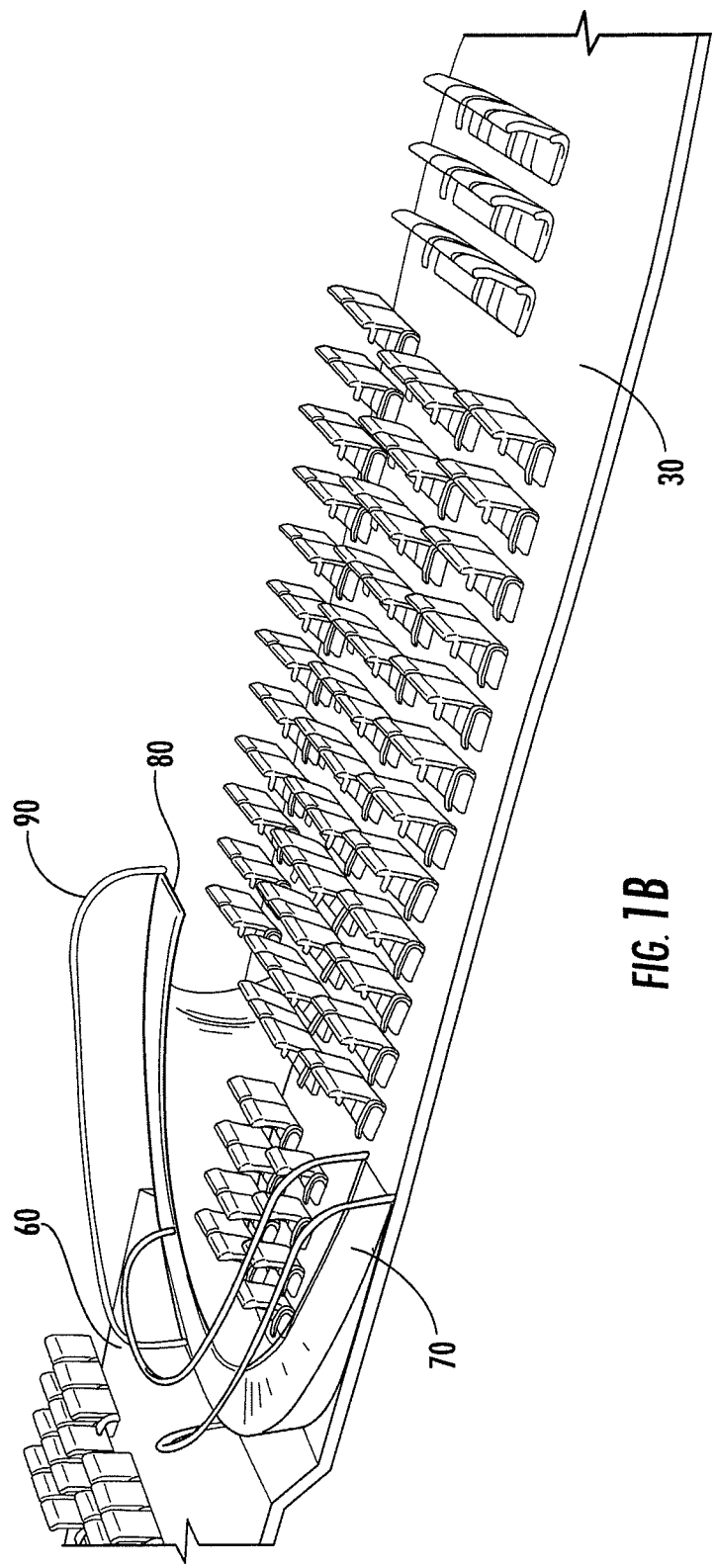
Figure 2:
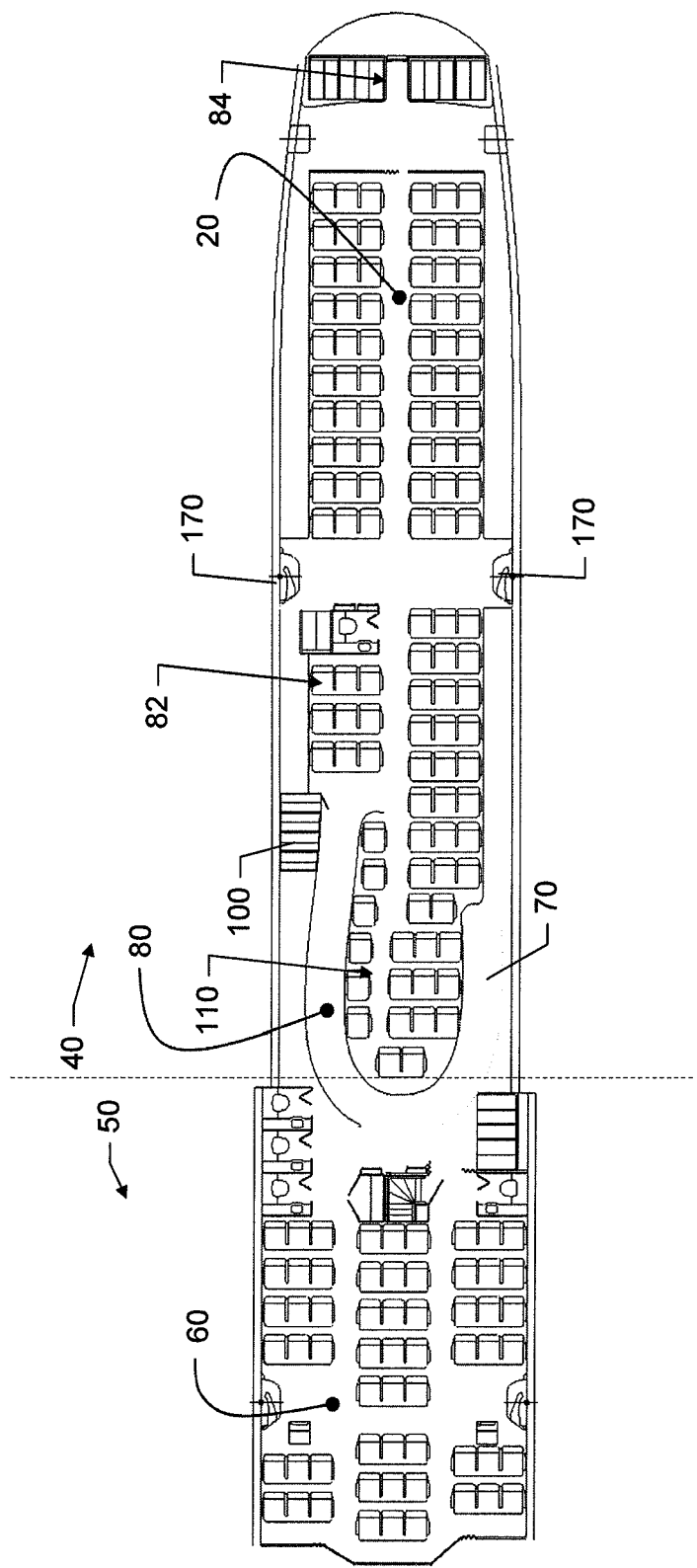
Figure 3:
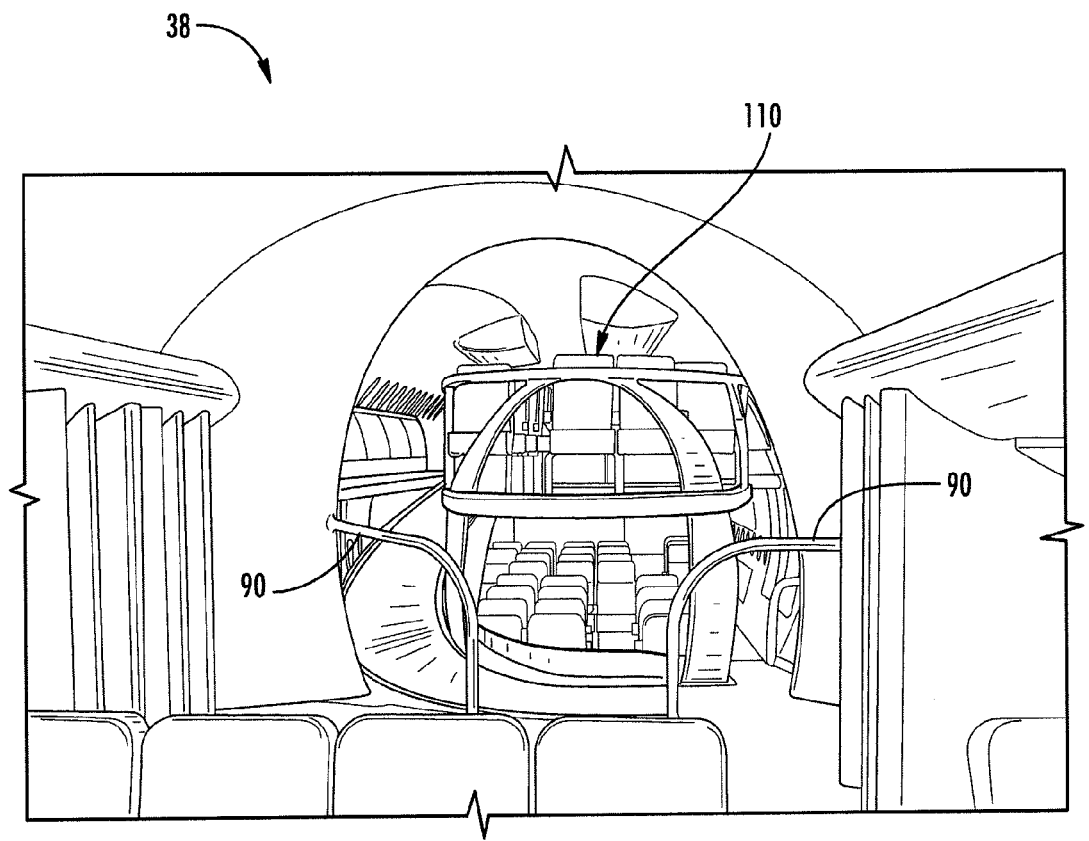
Figure 4:
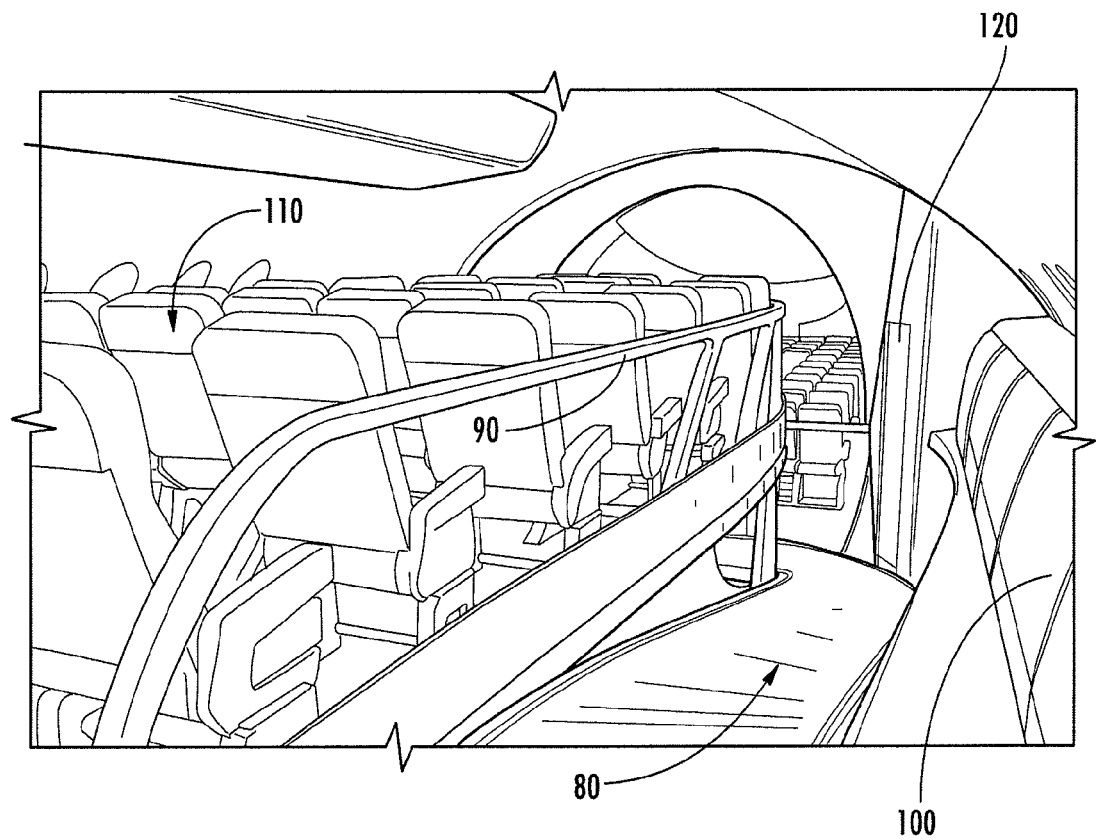
Figure 5:
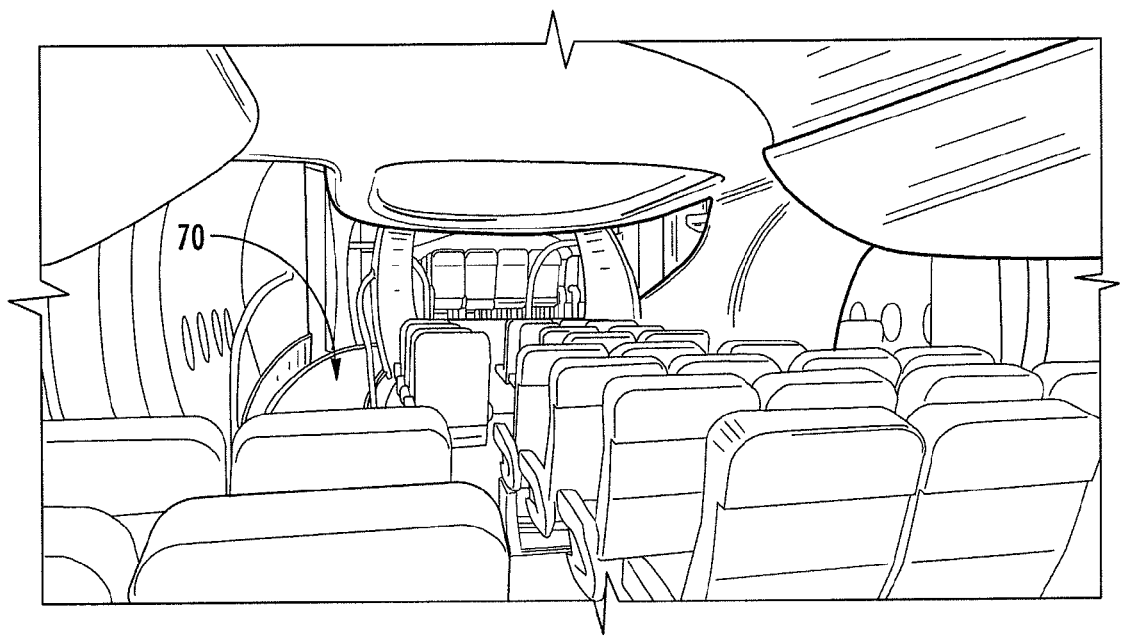
Figure 6:
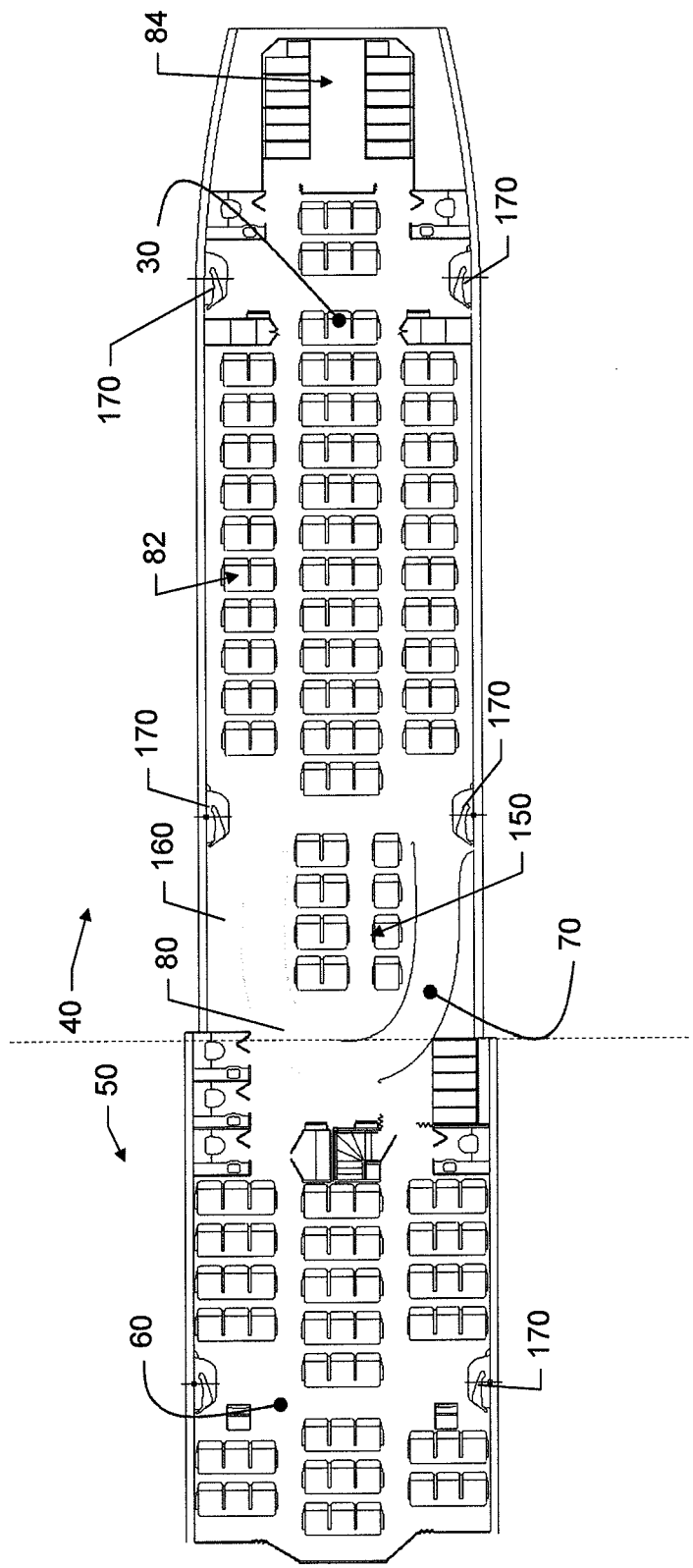
Figure 7:
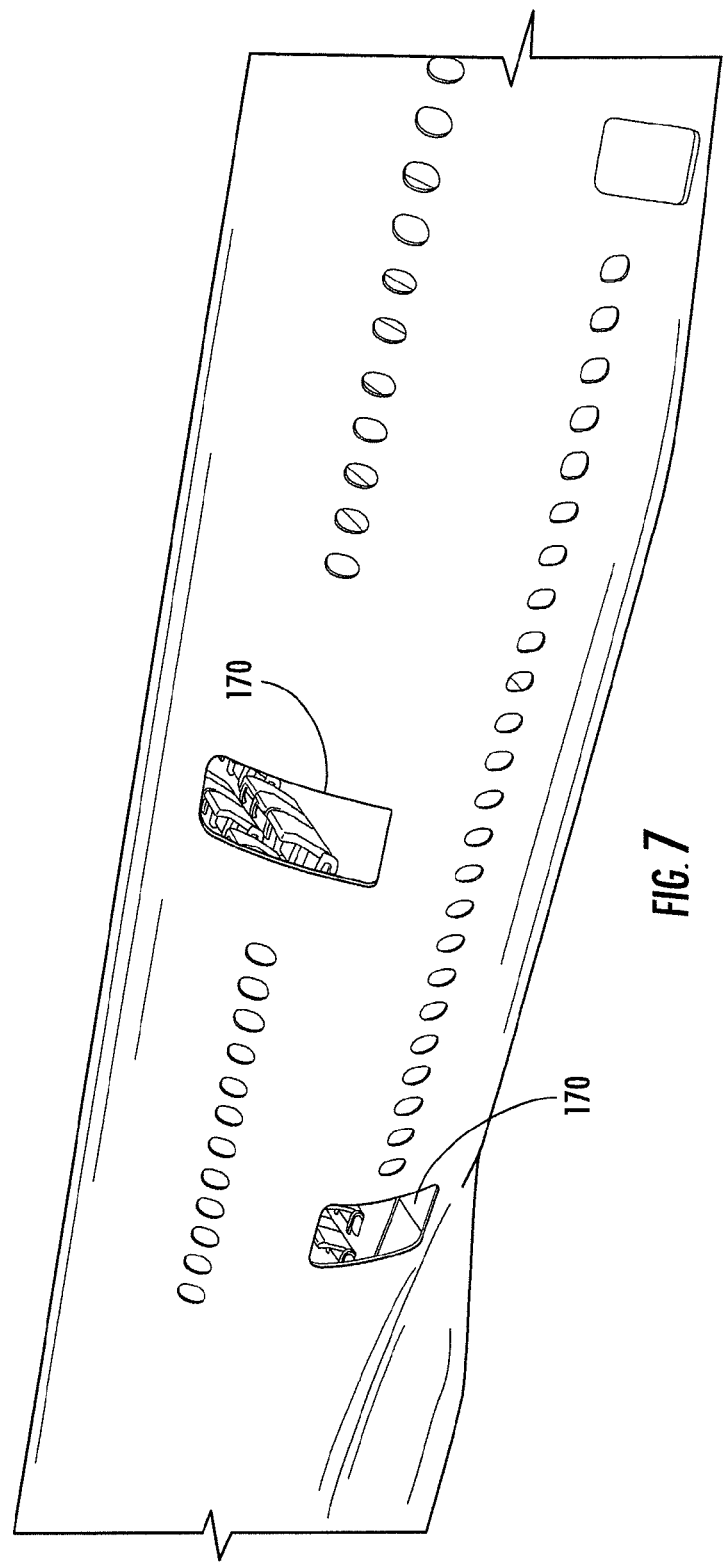
Figure 8:
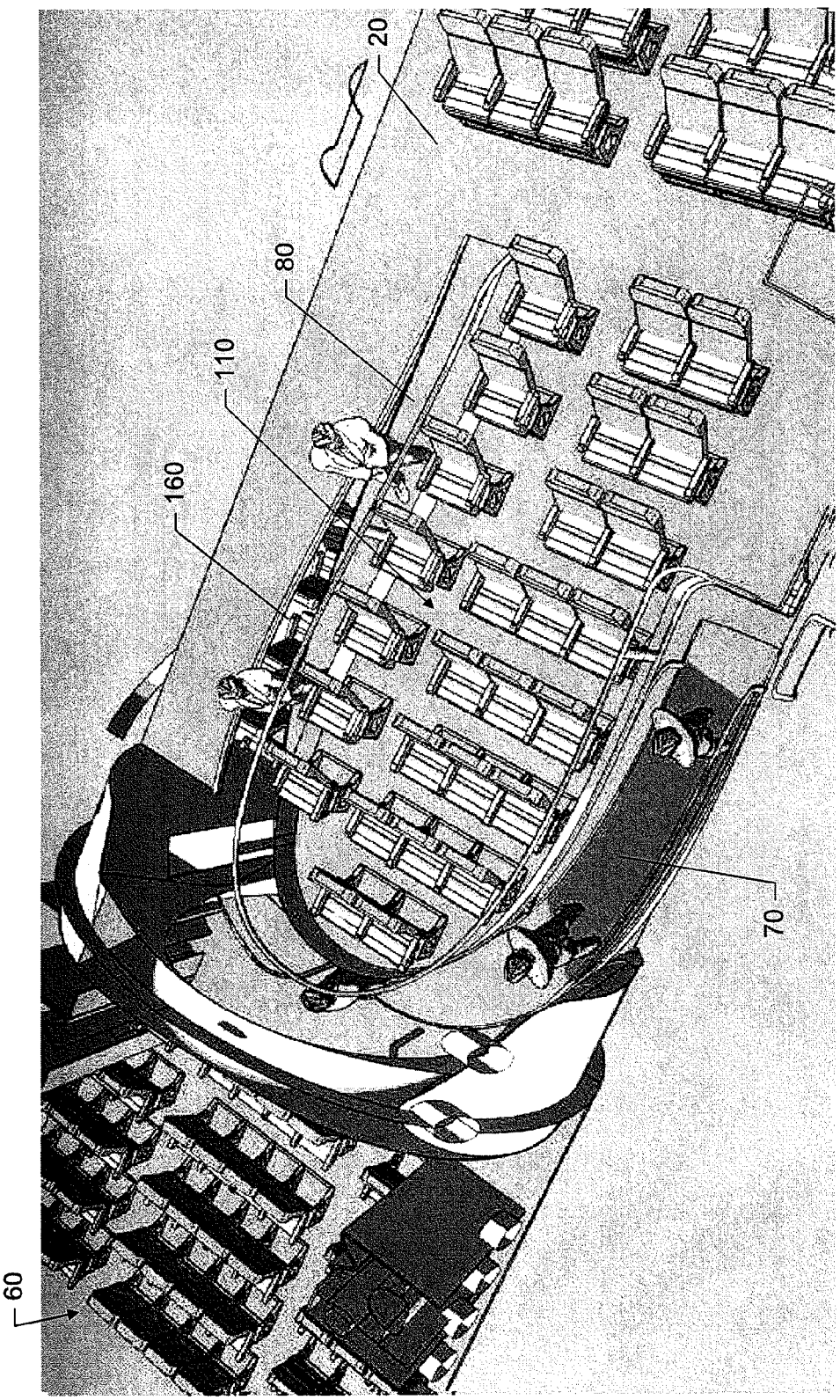

Having thus described the disclosure in general terms, reference will now be made to the accompanying drawings, which are not necessarily drawn to scale, and wherein:

FIG. 1, which includes FIGS. 1A and 1B, illustrates a cutaway perspective view of the side of an aircraft with the fuselage walls of the aircraft removed to reveal seating in the aircraft cabin according to an example embodiment;

FIG. 2 illustrates a top view of the upper deck of a multiple deck cabin configuration of the aircraft of FIG. 1 according to an example embodiment;

FIG. 3 provides a view of the upper and lower decks from a point near the centerline of the fuselage looking aft from a position on the intermediate deck according to an example embodiment;

FIG. 4 provides a view of the intermediate deck and a portion of the upper inter-ramp region looking down a ramp according to an example embodiment;

FIG. 5 provides a view of the intermediate deck looking forward from the lower deck according to an example embodiment;

FIG. 6 illustrates a top view of the lower deck of a multiple deck cabin configuration of the aircraft of FIG. 1 according to an example embodiment;

FIG. 7 provides a perspective view of a side of the aircraft of FIG. 1 with the aircraft skin displayed to show some of the potential locations at which doors may be placed according to an example embodiment; and FIG. 8 illustrates a perspective view of the interior or an aircraft cabin of an example embodiment.

DETAILED DESCRIPTION

The present disclosure now will be described more fully hereinafter with reference to the accompanying drawings, in which some, but not all embodiments are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

As discussed above, multiple deck commercial aircraft that have stairs or ladders therebetween may present challenges in movement of people and baggage between decks. Example embodiments of the present disclosure may overcome some of these challenges by providing ramps that extend from an intermediate deck that includes a seating area down opposing sides of the interior of the aircraft fuselage. In this regard, a ramp extending from the intermediate deck may be in contact with one cabin wall to provide access to an upper deck and another ramp extending from the intermediate deck may be in contact with the other cabin wall to provide access to a lower deck of the aircraft.

FIG. 1, which includes FIGS. 1A and 1B, illustrates a cutaway perspective view of the side of an airliner with the fuselage walls removed to reveal seating in the aircraft cabin. The view of FIG. 1 illustrates an upper deck 20 and a lower deck 30 positioned spaced apart from each other to provide two levels of seating in a first portion 40 of the aircraft cabin. The upper deck 20 and the lower deck 30 of FIG. 1 may be substantially mirror images of each other in some cases. However, in other situations, the seating arrangements on each deck may be different. For example, in some example embodiments, one deck may be shorter, longer, wider or narrower than the other deck depending on design requirements and/or desirable design features.

As shown in FIG. 1, a second portion 50 of the aircraft cabin may include an intermediate deck 60 (or main deck). The intermediate deck 60 may be positioned at a height that is between the respective heights of the upper deck 20 and the lower deck 30. The intermediate deck 60 may be positioned closer to the height of the lower deck 30 than that of the upper deck 20. However, in alternative embodiments, that arrangement could be reversed or the intermediate deck 60 may even be positioned substantially half way between the upper and lower decks 20 and 30. In some embodiments, the intermediate deck 60 may be considered to be the main deck of the cabin, and therefore the intermediate deck 60 may be on the same level as that of the cockpit of the aircraft. According to an example embodiment, a first ramp 70 may extend from the intermediate deck 60 to the lower deck 30 and a second ramp 80 may extend from the intermediate deck 60 to the upper deck 20. As such, the first and second ramps 70 and 80 may provide ramped walkway access between each of the decks of the cabin to enable passengers to access seats (e.g., seats 82) on any of the decks.

The first and second ramps 70 and 80 shown in FIG. 1 (and FIG. 2) generally extend from a centrally located position (e.g., close to the centerline of the fuselage) on the intermediate deck 60 in opposite directions away from the centerline as they sweep outward and back in order to approach and extend along opposite cabin walls until the respective upper deck 20 and lower deck 30 are reached. Thus, in the example of FIG. 1, the first and second ramps 70 and 80 may form an elliptical shape (or at least form the shape of an arc of an ellipse). However, other example embodiments may employ other ramp shapes such as semi-circular, L-shaped, or even straight or irregular shaped ramps.

The upper deck 20, the lower deck 30 and the intermediate deck 60 may each be planar surfaces that lie substantially parallel to each other but are separated by a vertical distance from each other. Thus, generally speaking, the first and second ramps 70 and 80 may each be formed as an inclined or sloped surface that is itself substantially planar, but has either an incline or decline defined by the slope of the surface as it connects either the lower deck 30 to the intermediate deck 60 (in the case of the first ramp 70) or the upper deck 20 to the intermediate deck 60 (in the case of the second ramp 80). The slope of the first and second ramps 70 and 80 may be substantially constant over the length of the ramps. However, in some embodiments, slight variations in the slope may be employed over the length of the ramps. The width of the first and second ramps 70 and 80 may vary according to design requirements, but in some embodiments may be chosen to ensure that two passengers could pass each other going in opposite directions without substantial difficulty. In some cases, the width could be selected to ensure two galley carts or two average sized carry-on bags could pass each other on the ramps. The ramps may include handrails 90 extending on either or both sides of the ramps.

FIG. 2 illustrates a top view of the upper deck 20 according to an example embodiment. FIG. 2 also shows a top view of a portion of the intermediate deck 60. In the example of FIG. 2, the second ramp 80 has an elliptical shape extending from a centerline of the intermediate deck 60 outward toward a wall of the cabin while inclining to a level of the upper deck 20 as the second ramp 80 extends toward a rear of the aircraft (away from the intermediate deck 60). It should be noted, however, that the ramps of example embodiments could extend forward and the multiple level portion of the cabin could be positioned in front of the intermediate deck 60 in some cases. Moreover, multiple sets of ramps could be included in some cases. Thus, for example, another set of ramps could be provided at a rear of the aircraft such that the galley 84 shown in FIG. 2 could service both levels instead of just the upper deck 20.

In an example embodiment, the second ramp 80 may extend substantially along the wall of the cabin as it inclines from the level of the intermediate deck 60 to the level of the upper deck 20. However, as shown in FIG. 2, there may be storage areas 100 positioned outboard of the second ramp 80 or between the second ramp 80 and the cabin wall in some embodiments. The storage areas 100 may be provided for galley cart storage. However, in some embodiments, the storage areas 100 may be provided for receiving passenger carry-on baggage. Moreover, in some embodiments, the storage areas 100 may be assigned to specific seats such as those seats located in an upper inter-ramp region 110. The upper inter-ramp region 110 may be defined as the area of the upper deck 20 that is spaced apart from each of the cabin walls by the first ramp 70 and the second ramp 80, respectively. Since the upper inter-ramp region 110 is not adjacent to the cabin walls, overhead storage may not be available for these seats in some cases. Thus, the storage areas 100 may provide some additional storage for these seats that is conveniently accessible to passengers in those seats, both when boarding and disembarking.

Seats in the upper inter-ramp region 110 may have a unique view of architectural features created by virtue of the placement of the first and second ramps 70 and 80. For example, the seats of the upper inter-ramp region 110 may have a unique and elevated view of the intermediate deck 60 and arch type architectural features used to facilitate provision of the first and second ramps 70 and 80. FIGS. 3 to 5 provide some examples of these views. In this regard, FIG. 3 provides a view of the upper and lower decks 20 and 30 from a point near the centerline of the fuselage on the intermediate deck 60. Meanwhile, FIG. 4 provides a view of the intermediate deck 60 and a portion of the upper inter-ramp region 110 looking down the second ramp 80. As can be seen in FIG. 4, the storage areas 100 may be provided along the cabin wall. Moreover, given that increased overhead space is available in areas between where the first and second ramps 70 and 80 meet and the cabin wall, an oversized lavatory 120 or other storage may be provided near the bottom of the second ramp 80. FIG. 5 provides a view of the intermediate deck looking forward from the lower deck according to an example embodiment.

Seats in the upper inter-ramp region 110 may also be positioned in an atypical fashion due to the unique shape of the upper inter-ramp region 110. In some cases, the seats in the upper inter-ramp region 110 may be considered to be a separate class of seat, with corresponding premium pricing associated therewith. The upper inter-ramp region 110 seats could be segregated from other seats (e.g., with a curtain) or may have a different style of seat, with potentially more leg room or capability for reclining, etc. In some cases, group seating may be provided for private groups that wish to sit together in a common area. Additionally or alternatively, the upper inter-ramp region 110 may be useful for placing single seats (i.e., seats that do not have a seat immediately adjacent on the right or left thereof) that may provide seclusion for passengers that desire to avoid sitting next to other passengers, or increased space for those desiring such conditions.

The upper inter-ramp region 110 may essentially form a cantilevered region of the upper deck 20 that extends forward (or rearward in some cases) from a main portion of the upper deck 20. The cantilevered region may be distinct from the main portion of the upper deck 20 by virtue of the fact that the main portion of the upper deck 20 may extend from cabin wall to cabin wall, while the cantilevered region is spaced apart from each of the walls (by the ramps). Of note, even though the upper inter-ramp region 110 may be referred to as the cantilevered region, the upper inter-ramp region 110 may have supports (e.g., arch structures or other support structures) and thus the term "cantilevered region" may actually refer to the visual appearance of the upper inter-ramp region 110 as being cantilevered.

FIG. 6 illustrates a top view of the lower deck 30 according to an example embodiment. FIG. 6 also shows a top view of the portion of the intermediate deck 60 that is also shown in FIG. 2. In the example of FIG. 6, the first ramp 70 is shown also with an elliptical shape extending from a centerline of the intermediate deck 60 outward toward a wall of the cabin while declining to a level of the lower deck 30 as the first ramp 70 extends toward a rear of the aircraft (away from the intermediate deck 60). Again, the ramps of example embodiments could extend forward and the multiple level portion of the cabin could be positioned in front of the intermediate deck 60 in some cases and/or multiple sets of ramps could be included.

The space between the first and second ramps 70 and 80 may again define an inter-ramp region in the form of the lower inter-ramp region 150. The lower inter-ramp region 150 may be the same size or perhaps smaller than the upper inter-ramp region 110. Seating considerations similar to those described above in connection with the upper inter-ramp region 110 may also apply to the lower inter-ramp region 150. In an example embodiment, a void space 160 may be defined in the region underneath and/or outboard of the second ramp 80. The void space 160 may be converted to private (or semi-private) seating, storage lockers or bins, and/or other utility or lavatory spaces as needed or desired.

FIGS. 2 and 6 also illustrate the positions of several optional doors 170. All boarding and disembarking of passengers could take place from the intermediate deck 60 in some cases. However, example embodiments provide ample opportunity for the variation of door and seat placements in unique ways given the improved ability to safely and easily move between the intermediate deck 60 and either or both of the upper deck 20 and the lower deck 30. FIG. 7 provides a perspective view of a side of the aircraft of FIG. 1 with the aircraft skin displayed to show some of the potential locations at which doors may be placed to take advantage of possible different boarding scenarios involving use of the ramps to provide accessibility among the different levels of the cabin using the ramp system described herein. FIG. 8 illustrates a perspective view of the interior or an aircraft cabin of an example embodiment showing several of the elements described above. Moreover, FIG. 8 illustrates the semi-private seating that may be provided in the void space 160.

Example embodiments may therefore provide for a unique architectural configuration with aesthetically pleasing features that greatly improve the functional performance of modes of traveling between decks on an aircraft. Furthermore, example embodiments may enhance the spaciousness or at least the perception of spaciousness of the cabin. The use of ramps in the cabin to provide access between decks may also improve or at least mitigate access conditions for elderly, very young and/or disabled passengers. Movement of carts and baggage between levels may also be facilitated. In some cases, the ability to move carts by wheeling them up and down ramps may prevent the need to provide cart lifts and therefore simplify aircraft design and reduce the overall weight of the aircraft. Boarding and disembarking operations may also be facilitated by example embodiments.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:
1. An aircraft comprising a cabin including:
a first portion including an upper deck and a lower deck, the upper deck and the lower deck being disposed proximate to each other with vertical separation therebetween, wherein the upper deck comprises an upper cantilevered region and an upper main deck region, said upper cantilevered region spaced from opposite walls of the cabin with openings between the upper cantilevered region and the opposite walls of the cabin and said upper main deck region extending between the opposite walls of the cabin, said upper cantilevered region being operably connected to and extending outwardly from the upper main deck region so as to extend in a cantilevered fashion therefrom;

a second portion including an intermediate deck disposed in a plane that is vertically separated from both the upper deck and the lower deck, wherein the intermediate deck includes seats to accommodate seated passengers;

a first ramp extending between the lower deck and the intermediate deck to provide access therebetween; and a second ramp extending between the upper deck and the intermediate deck to provide access therebetween, wherein the first and second ramps each extend in a curved manner from a substantially common point on the intermediate deck away from each other toward opposite walls of the cabin, wherein the openings between the upper cantilevered region and the opposite walls of the cabin overlie the first and second ramps.

2. The aircraft of claim 1, wherein at least one of the first ramp and the second ramp extends from a centerline portion of the cabin, relative to the opposite walls of the cabin, on the intermediate deck to a portion of a respective one of the lower deck or the upper deck that is substantially outboard of the centerline of the cabin.

3. The aircraft of claim 1, wherein the second portion is configured forward of the first portion with respect to a nose of the aircraft.

4. The aircraft of claim 1, wherein the first ramp slopes downward from a level of the intermediate deck to a level of the lower deck while extending aft toward a tail of the aircraft and the second ramp slopes upward from a level of the intermediate deck to a level of the upper deck while extending aft toward a tail of the aircraft.

5. The aircraft of claim 1, wherein an upper inter-ramp region is defined between the first ramp and the second ramp on the upper deck and a lower inter-ramp region is defined between the first ramp and the second ramp on the lower deck, and wherein the upper inter-ramp region and the lower inter-ramp region include seats to accommodate passengers and are spaced from the opposite walls of the cabin by the first and second ramps.

6. The aircraft of claim 5, wherein the upper inter-ramp region includes seats positioned to overlook seats on the intermediate deck.

7. The aircraft of claim 1, wherein a space adjacent to a wall of the cabin and proximate to at least one of the first ramp or the second ramp includes a storage containment area.

8. The aircraft of claim 1, wherein a space adjacent to a wall of the cabin and substantially below the second ramp includes a semi-private seating area.

9. The aircraft of claim 1, wherein a door for facilitating boarding and disembarkation for each of the upper level, the lower level and the intermediate level is placed proximate to an end of either the first ramp or the second ramp.

10. An aircraft comprising a cabin including:
an upper deck; and
a lower deck,
wherein the upper and lower deck are disposed proximate to each other with vertical separation therebetween, wherein the upper deck comprises an upper cantilevered region and an upper main deck region, said upper cantilevered region spaced from opposite walls of the cabin with openings between the upper cantilevered region and the opposite walls of the cabin and said upper main deck region extending between the opposite walls of the cabin, said upper cantilevered region being operably connected to and extending outwardly from the upper main deck region so as to extend in a cantilevered fashion therefrom; and
first and second ramps that extend toward the opposite walls of the cabin, wherein the openings between the upper cantilevered region and the opposite walls of the cabin overlie the first and second ramps.

11. The aircraft of claim 10, wherein the upper cantilevered region extends forward of the upper main deck region.

12. The aircraft of claim 10, wherein the cabin includes an intermediate deck between the upper and lower decks and wherein the upper cantilevered region looking out over the intermediate deck, wherein the intermediate deck includes seats to accommodate seated passengers.

13. An aircraft ramp comprising:
a first ramp portion extending from an upper deck of a first portion of an aircraft cabin to an intermediate deck of a second portion of the aircraft cabin, wherein both the upper deck and the intermediate deck include seats to accommodate seated passengers, wherein the upper deck comprises an upper cantilevered region and an upper main deck region, said upper cantilevered region spaced from opposite walls of the cabin with openings between the upper cantilevered region and the opposite walls of the cabin and said upper main deck region extending between the opposite walls of the cabin, said upper cantilevered region being operably connected to and extending outwardly from the upper main deck region so as to extend in a cantilevered fashion therefrom; and
a second ramp portion extending from a lower deck of the first portion of the aircraft cabin to the intermediate deck, the upper deck and the lower deck being disposed proximate to each other with vertical separation therebetween and the intermediate deck being vertically separated from both the upper deck and the lower deck, wherein the lower deck includes seats to accommodate seated passengers,
wherein the first and second ramp portions each extend in a curved manner from a substantially common point on the intermediate deck away from each other toward opposite walls of the aircraft cabin, wherein the openings between the upper cantilevered region and the opposite walls of the cabin overlie the first and second ramps.

14. The aircraft ramp of claim 13, wherein at least one of the first ramp portion and the second ramp portion extends from a centerline portion the aircraft cabin, relative to the opposite walls of the aircraft cabin, on the intermediate deck to a portion of a respective one of the lower deck or the upper deck that is substantially outboard of the centerline of the aircraft cabin.

15. The aircraft ramp of claim 13, wherein the first ramp portion slopes downward from a level of the intermediate deck to a level of the lower deck while extending aft toward a tail of the aircraft and the second ramp portion slopes upward from a level of the intermediate deck to a level of the upper deck while extending aft toward a tail of the aircraft.

16. The aircraft ramp of claim 13, wherein an upper inter-ramp region is defined between the first ramp portion and the second ramp portion on the upper deck and a lower inter-ramp region is defined between the first ramp portion and the second ramp portion on the lower deck, and wherein the upper inter-ramp region and the lower inter-ramp region include seats to accommodate passengers and are spaced from the opposite walls of the cabin by the first and second ramps.

17. The aircraft ramp of claim 16, wherein the upper inter-ramp region includes seats positioned to overlook seats on the intermediate deck.

18. The aircraft ramp of claim 13, wherein the aircraft ramp defines a space adjacent to a wall of the aircraft cabin and proximate to at least one of the first ramp portion or the second ramp portion includes a storage containment area.

19. The aircraft ramp of claim 13, wherein the aircraft ramp defines a space adjacent to a wall of the aircraft cabin and substantially below the second ramp portion includes a semi-private seating area.

20. The aircraft of claim 1, wherein the first and second ramps define an arc of an ellipse.

21. The aircraft of claim 10, wherein the first and second ramps define an arc of an ellipse.

22. The aircraft ramp of claim 13, wherein the first and second ramps define an arc of an ellipse.

\* \* \* \* \*